May 29, 1962 R. A. JEROTHE 3,036,927
METHOD OF COATING VINYL FILM WITH A SURFACING COLOR
Filed Nov. 30, 1959
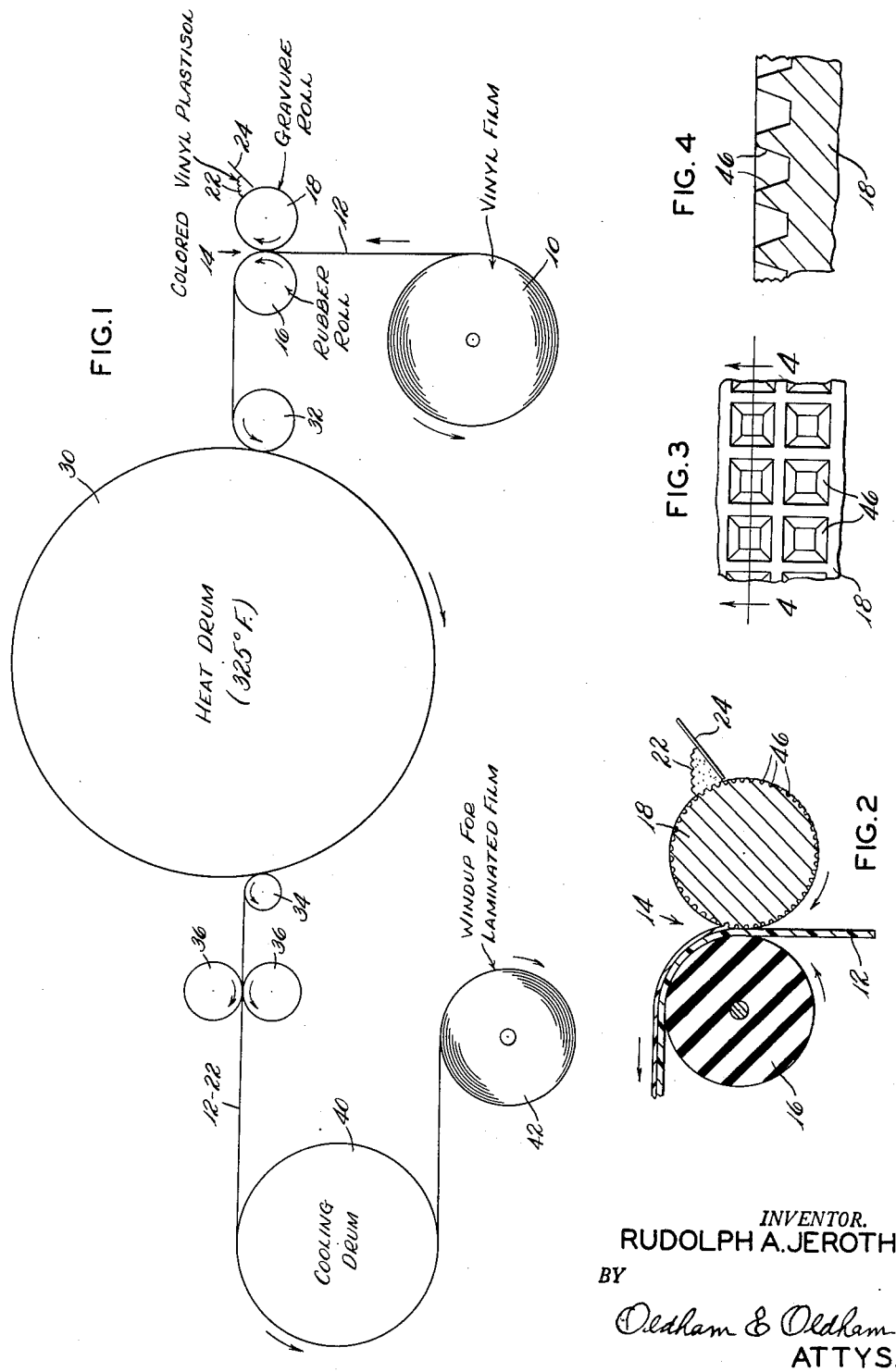
INVENTOR.
RUDOLPH A. JEROTHE
BY
Oldham & Oldham
ATTYS.

United States Patent Office 3,036,927
Patented May 29, 1962

3,036,927
METHOD OF COATING VINYL FILM WITH A SURFACING COLOR
Rudolph A. Jerothe, Wayne, N.J., assignor to Toscony, Inc., New York, N.Y., a corporation of New York
Filed Nov. 30, 1959, Ser. No. 856,241
4 Claims. (Cl. 117—7)

This invention relates to improved methods for providing vinyl films of a plurality of colors, and, more particularly, is concerned with an improved method of coating vinyl film with a surfacing color of vinyl.

Heretofore it has been the standard practice in the vinyl film industry for a user or a fabricator of vinyl films to order vinyl film of a particular color from a film manufacturer. However, the manufacturer normally requires a relatively large order of a vinyl film of a particular color in order to run a sufficient quantity of this color film on a calender to bring the square yard cost within reason. Often the user of the vinyl film or a fabricator does not need this much vinyl film of a particular color, or when it is delivered by the manufacturer it is found to be slightly off color, and an entire new batch has to be run by the manufacturer to the considerable cost of the manufacturer and/or the fabricator or user.

It is the general object of the present invention to avoid and overcome the foregoing and other difficulties of and objections to prior art practices by the provision of an improved method of coating a completely formed and fused vinyl film with a surface color of vinyl, and whereby the user or fabricator of vinyl film can with relatively light and inexpensive apparatus quickly and inexpensively obtain in his own plant vinyl film of a desired color and in any quantity required by applying a surface color of vinyl to a basic vinyl film of neutral, related, or opposite contrast color obtained in large quantities from the vinyl film manufacturer.

Another object of the invention is to provide an improved method whereby a very uniform and relatively thin layer of vinyl plastisol of a desired color can be applied to and fused to a base vinyl film of neutral, opposite or related color in a rapid and inexpensive manner to obtain a high quality finished product having uniform light transmission qualities and free from streaking or other non-uniformities, and with the coating layer having the same physical and chemical properties as the base and bonded inseparably thereto which is not the case with surface coatings of ink, paints, or like materials which often delaminate in use.

Another object of the invention is the provision of a method of the character described wherein the method can be readily performed in the plant of a user or fabricator of vinyl film and with a minimum of apparatus requirements.

The foregoing objects of the invention, and other objects which will become apparent as the description proceeds, are achieved by the provision of that method of coating vinyl film with a surfacing color of vinyl which includes the steps of continuously passing a completely fused film of vinyl having a thickness of more than about 3 mils over an elongated path, continuously coating one side of the vinyl film with a liquid vinyl plastisol of the surfacing color and to a thickness of less than about 3 mils, continuously heating the plastisol while applying pressure thereto to fuse the plastisol into a solidified thin vinyl coating on the surface of the vinyl film, continuously cooling the aggregate film, and continuously winding up the aggregate film.

For a better understanding of the invention reference should be had to the accompanying drawings wherein
FIG. 1 is a diagrammatic side elevation of a typical apparatus utilized in the practice of the method of the invention;

FIG. 2 is an enlarged vertical cross-sectional view illustrating in greater detail the gravure roll method for applying the vinyl plastisol to the vinyl film;

FIG. 3 is an enlarged plan view of the surface of the gravure roller of FIG. 2; and FIG. 4 is a fragmentary cross-sectional view taken substantially on line 4—4 of FIG. 3.

In the drawings, the numeral 10 indicates a roll of vinyl film 12 adapted to be moved continuously in an elongated path as best seen in FIG. 1. The film 12, having a thickness of from about 3 mils to about 20 mils, is completely fused and ready for use, and can be bought in a neutral or other color in large quantities from a film manufacturer using heavy film producing equipment. The film 12 is passed to coating rollers indicated as a whole by the numeral 14. These rollers include a rubber roll 16, and a gravure roll 18 driven in the direction of the arrows. The roll 18 picks up on its surface a layer of vinyl plastisol 22 in liquid form carried in a trough by a blade 24 engaging with the side of the roller 18. As hereinafter described in greater detail, the plastisol material is transferred from the roll 18 to the surface of the film 12 and is relatively thin, normally being less than 3 mils, and usually about 1 mil in thickness.

Passing from the rubber roll 16 the vinyl film 12 with a coating of liquid vinyl plastisol thereon is pressed into engagement with a heat drum 30, heated, for example, to a temperature of about 325° Fahrenheit, by means of a roller 32 and the film travels with the drum which is turning in the direction shown by the arrow for a sufficient length of time so that the liquid vinyl plastisol 22 held under pressure by the tension on the vinyl film 12 against the surface of the heat drum is fused and solidified into an aggregate film constituting a relatively thin surface coating of vinyl on the base vinyl film 12.

From the drum 30 the aggregate film, now marked with the number 12—22 passes over a roller 34, between polishing or compacting rolls 36 if this is desired, and then around the periphery of a cooling drum 40 having its surface positioned in tangent relationship with the pass of rolls 36, with the cooling drum 40 engaging with the vinyl base film 12 side of the aggregate. The cooled aggregate film 12—22 is continuously wound upon a roll 42.

In accord with the method just described, and illustrated with one particular embodiment of apparatus, it is possible for the user or fabricator of vinyl films to buy rolls 10 of vinyl film in neutral or other colors and in large quantities from a vinyl film manufacturer having heavy and expensive film forming equipment. Thereafter, utilizing the method of the invention, the user or fabricator of the vinyl film can convert the vinyl film 12 to a relatively small run or amount of vinyl film possessing a desired color by merely mixing up a vinyl plastisol of the desired color and then applying this vinyl plastisol as a thin layer, usually about 1 mil, to the surface of the vinyl film 12 followed by the setting up or fusing of the surfacing coat of plastisol, cooling and rewinding. If a particular run or start of a run of aggregate film is not found to be the desired color more or less pigmenting materials of a darker or lighter variety can be placed in the trough provided by the blade 24 so as to bring the finished aggregate to exactly the desired shade to match previous or desired colors of vinyl films. In other words, the method of the invention has a versatility and usefulness which is of material aid and benefit to the user or fabricator of vinyl films, as will be evident.

A very important part of the method of the invention is the manner of application of the vinyl plastisol to the base vinyl film 12. One method of accomplishing the deposit of a satisfactory, thin, but highly uniform application of the vinyl plastisol to the base film 12 has been generally described.

More specifically, and having reference to FIGS. 2 to 4, this method utilizes the rubber roll 16 over which the preformed vinyl film 12 is passed in the direction shown by the arrow. Having surface rolling engagement with the film 12 under an adjustable pressure is the metal gravure roll 18 which has very fine pockets engraved or etched on its entire surface, these pockets being more clearly indicated at 46 in the enlarged views of the gravure roll surface shown in FIGS. 3 and 4. The pockets 46 number, for example, as many as 55 to a linear inch or over 2,000 per square inch. The gravure roll 18 is utilized in association with the blade 24 which carries a pocket of vinyl plastisol 22 in engagement with the roll surface so that as the roll 18 turns in the direction of the arrow the pockets 46 carry a very thin layer of plastisol, for example of one mil thickness, into engagement with the surface of the film 12, it being understood that not all of the plastisol present in the pockets 46 is transferred to the surface of the film, but only the upper portion of the plastisol carried in each pocket 46. It has been found that the large number of dots per square inch of the plastisol 22 applied to the base film 12 with the gravure roll in the manner described coalesces or unites when applied to the surface of the base film 12 to form a very uniform and continuous surface of vinyl plastisol on the base film 12 as it leaves the roller 16 for passage to the heat drum.

While in accord with the patent statutes certain best known embodiments of the invention have been illustrated and described in detail, it is to be particularly understood that the invention is not to be limited thereto or thereby, but that its scope is defined in the appended claims.

What is claimed is:

1. That method of providing a polyvinyl chloride film having a desired color which includes the steps of producing in large quantities a completely fused stock polyvinyl chloride film of a neutral color and of a thickness in excess of three mils, selecting a limited quantity of such stock film and progressively and continuously passing it over an elongated path, providing liquid polyvinyl chloride plastisol compounded with the desired color, progressively and continuously applying with pressure the liquid plastisol to one surface of the cold stock film as a series of dots of over 2000 per square inch, allowing the stock film to progressively and continuously advance in a substantially horizontal plane with the liquid plastisol on the upper surface thereof to permit the dots of liquid plastisol to flow together and form a colored surface coating of plastisol of less than three mils on the stock film, thereafter progressively and continuously moving the coated stock film through a curved elongated path while applying heat to the plastisol side of the film and while tensioning the stock film to apply pressure on the plastisol to thereby unite, fuse and solidify the plastisol and adhere it to the stock film, continuously and progressively subjecting the still hot film to polishing and compacting forces, and continuously and progressively cooling and winding up the film.

2. That method of providing a polyvinyl chloride film having a desired color which includes the steps of producing in large quantities a completely fused stock polyvinyl chloride film of a neutral color and of a thickness in excess of three mils, selecting a limited quantity of such stock film and progressively and continuously passing it over an elongated path, providing liquid polyvinyl chloride plastisol compounded with the desired color, progressively and continuously applying with pressure the liquid plastisol to the cold stock film as a series of dots, allowing the stock film to progressively and continuously advance to permit the dots of liquid plastisol to flow together and form a colored surface coating of plastisol of about one mil thickness on the stock film, thereafter progressively and continuously moving the coated film through a curved elongated path while applying heat to the plastisol side thereof and while tensioning the stock film to apply pressure on the plastisol to thereby unite, fuse and solidify the plastisol and adhere it to the stock film, continuously and progressively subjecting the still hot film to polishing and compacting forces, and continuously and progressively cooling and winding up the coated film.

3. That method of providing a polyvinyl chloride film having a desired color which includes the steps of producing in large quantities a completely fused stock polyvinyl chloride film of a neutral color and of a thickness in excess of three mils, selecting a limited quantity of such stock film and progressively and continuously passing it over an elongated path, providing liquid polyvinyl chloride plastisol compounded with the desired color, progressively and continuously applying with pressure the liquid plastisol to the cold stock film as a series of dots, thereafter progressively and continuously applying heat and pressure to the plastisol side of the film to thereby unite, fuse and solidify the plastisol and adhere it to the stock film, continuously and progressively subjecting the still hot film to polishing and compacting forces, and continuously and progressively cooling and winding up the film.

4. That method of providing a polyvinyl chloride film having a desired color which includes the steps of producing in large quantities a completely fused stock polyvinyl chloride film of a neutral color and of a thickness in excess of three mils, selecting a limited quantity of such stock film and progressively and continuously passing it over an elongated path, providing liquid polyvinyl chloride plastisol compounded with the desired color, progressively and continuously applying with pressure the liquid plastisol to the cold stock film as a series of dots, thereafter progressively and continuously applying heat and pressure to the plastisol side of the film to thereby unite, fuse and solidify the plastisol and adhere it to the stock film, and continuously and progressively cooling and winding up the film.

References Cited in the file of this patent

UNITED STATES PATENTS

| | | |
|---|---|---|
| 2,163,712 | Shearer | June 27, 1939 |
| 2,218,249 | Nadeau et al. | Oct. 15, 1940 |
| 2,312,927 | Murry | Mar. 2, 1943 |
| 2,396,946 | Grupe | Mar. 19, 1946 |
| 2,453,052 | Van Etten | Nov. 2, 1948 |
| 2,571,962 | Smith et al. | Oct. 16, 1951 |
| 2,700,630 | Bukey et al. | Jan. 25, 1955 |
| 2,711,132 | Viscardi | June 21, 1955 |
| 2,729,193 | Scholl | Jan. 3, 1956 |
| 2,741,215 | Cady et al. | Apr. 10, 1956 |
| 2,771,388 | Rocky et al. | Nov. 20, 1956 |